(12) United States Patent
Malkin et al.

(10) Patent No.: US 8,804,794 B2
(45) Date of Patent: Aug. 12, 2014

(54) ADJUSTABLE LATENCY TRANSCEIVER PROCESSING

(75) Inventors: Moshe Malkin, Mountain View, CA (US); Jose Tellado, Mountain View, CA (US); Frank McCarthy, Alameda, CA (US)

(73) Assignee: Aquantia Corporation, Milpitas, CA (US)

( * ) Notice: Subject to any disclaimer, the term of this patent is extended or adjusted under 35 U.S.C. 154(b) by 331 days.

(21) Appl. No.: 12/960,474

(22) Filed: Dec. 4, 2010

(65) Prior Publication Data

US 2012/0140797 A1 Jun. 7, 2012

(51) Int. Cl.
*H04B 1/38* (2006.01)

(52) U.S. Cl.
USPC ........... 375/219; 375/222; 375/229; 375/230; 375/260; 375/262; 375/265; 375/267

(58) Field of Classification Search
USPC ......... 375/219, 221, 222, 229, 260, 262, 265, 375/267; 370/203, 204, 205, 208, 209, 210
See application file for complete search history.

(56) References Cited

U.S. PATENT DOCUMENTS

| 7,227,883 | B2 | 6/2007 | Tellado et al. | |
|---|---|---|---|---|
| 7,366,231 | B2 | 4/2008 | Tellado et al. | |
| 8,023,402 | B2 * | 9/2011 | Roberts et al. | 370/210 |
| 8,023,584 | B2 * | 9/2011 | Zerbe et al. | 375/285 |
| 8,270,845 | B2 * | 9/2012 | Cheung et al. | 398/180 |
| 2005/0134307 | A1 * | 6/2005 | Stojanovic et al. | 326/31 |

* cited by examiner

*Primary Examiner* — Dhaval Patel
(74) *Attorney, Agent, or Firm* — Lance Kreisman; Peninsula Patent Group

(57) ABSTRACT

Embodiments of methods, apparatuses and systems for transceiver processing are disclosed. One method includes a transceiver receiving a data stream from a link partner transceiver. A link parameter of a link between the transceiver and the link partner transceiver is determined. Allocation of transceiver processing between high-latency processing and low-latency processing is based at least in part on the link parameter.

29 Claims, 10 Drawing Sheets

ADJUSTABLE LATENCY TRANSCEIVER PROCESSING

FIELD OF THE INVENTION

The invention relates generally to network communications. More particularly, the invention relates to a method, apparatus and system for adjustable latency transceiver processing.

BACKGROUND OF THE INVENTION

High-speed networks are continually evolving. The evolution includes continual advances in the operational speed of the networks. The network implementation of choice that has emerged is Ethernet networks physically connected over unshielded twisted pair wiring. Ethernet in its 10/100BASE-T form is one of the most prevalent high speed LANs (local area network) for providing connectivity between personal computers, workstations and servers.

High-speed LAN technologies include 100BASE-T (Fast Ethernet) and 1000BASE-T (Gigabit Ethernet). Fast Ethernet technology has provided a smooth evolution from 10 Megabits per second (Mbps) performance of 10BASE-T to the 100 Mbps performance of 100BASE-T. Gigabit Ethernet provides 1 Gigabit per second (Gbps) bandwidth with essentially the simplicity of Ethernet. There is a desire to increase operating performance of Ethernet to even greater data rates.

FIG. 1 shows a block diagram of a pair of Ethernet transceivers communicating over a bi-directional transmission channel, according to the prior art. An exemplar transmission channel includes four pairs of copper wire (links) 112, 114, 116, 118. The transceiver pair can be referred to as link partners, and includes a first Ethernet port 100 and a second Ethernet port 105. Both of the Ethernet ports 100, 105 include four transmitter $T_X$, receiver $R_X$, and I/O buffering sections corresponding to each of the pairs of copper wires 112, 114, 116, 118.

Successfully implementing high speed Ethernet networks supporting full-duplex transmission in a single frequency band is challenging. For long loop lengths, recovering the transmitted information requires significant computational resources. High-precision, high-speed signal-processing is required to be able to successfully decode the signal, often involving multiple filters that span many hundreds of taps.

Present Ethernet technology can include time domain processing of digital or analog signal streams to aid in detecting the received data and minimizing the harmful interference afflicting the received data. With the increasing data transmission rates, the electronic hardware required to implement the time domain processing increases dramatically.

Communication systems typically use filtering to reduce interference and distortion of Ethernet signals to help the receiver reliably decode the data transmitted by the remote link partner with a high probability. Applications where filtering can be used to improve data transport reliability include, for example, adjacent and co-channel interference rejection, transmit signal shaping, data equalization, echo cancelation near-end cross-talk cancellation, far end crosstalk cancelation, external noise or interference cancellation, non-linear interference cancellation, etc. A common filter implementation that can be utilized in many filtering functions is finite impulse response (FIR) filtering.

Time domain FIR filtering can potentially result in a costly hardware implementation. For example, if an FIR filter has a length P (taps), then in general, roughly P multiply and accumulate (MAC) operations are required per filtered output sample. Depending on the filter application, a large number of filter taps could be required to successfully achieve the filtering objective. The electronic circuitry required to implement such high performance FIR fitters can then become very large, resulting in increased chip complexity, area, and power dissipation. Ethernet transceivers may need to implement filters that require 50-1000 taps (P), in which each filter tap operates on a filter input signal sample that is delayed by one (or fraction of one) symbol period from filter input signal sample the next filter tap operates on. Additionally, high performance Ethernet systems can require multiple long filters to operate successfully.

For example, Ethernet systems can require echo, Near-end cross talk (NEXT) and Far-end cross talk (FEXT) cancellation and data equalization. Additionally, Ethernet systems generally include 4 adjacent twisted pair connections per communication link, requiring echo, NEXT and FEXT cancellation as well as data equalization for each of the pairs. Therefore, an Ethernet system would typically include four echo-cancellation filters, four data-equalization filters, twelve NEXT-cancellation filters and twelve FEXT-cancellation filters.

Block-processing or domain-transformation techniques can be used to implement filtering in a way that significantly reduces the hardware implementation costs for long filters. An example of such an implementation is one using fast-Fourier-transform processing to implement the filtering.

While block-processing results in significantly lower complexity, block processing usually introduces additional processing delay, or latency, because of the block-by-block processing, often involving buffering a block of filter input samples before transforming them to the efficient filtering domain. The latency of a signal processed through a transceiver is an important system parameter that is desirable to minimize. Having high-latency can result in too much delay affecting the transmission of data and can adversely affect network systems requiring low-latency transmission of data. For applications requiring low-latency processing, the block by block processing used to reduce the transceiver hardware complexity can compromise the processing latency.

It is desirable to have an apparatus and method for supporting both lower latency processing as well as hardware efficient higher latency processing, for processing signal streams for reducing interference of Ethernet LAN signals to aid in receiver data detection. The lower latency and higher latency processing should require a minimal amount of electronic hardware, and dissipate a minimal amount of power.

SUMMARY OF THE INVENTION

An embodiment includes a method of transceiver processing. The method includes a transceiver communicating with a link paltrier transceiver. A link parameter of a link between the transceiver and the link partner transceiver is determined. Allocation of transceiver processing between high-latency processing and low-latency processing is based at least in part on the link parameter.

Another embodiment includes a transceiver. The transceiver includes high-latency processing circuitry and low-latency processing circuitry. A transceiver processing controller allocates transceiver processing between the high-latency processing circuitry and the low-latency processing circuitry based at least in part on a link parameter of a link between the transceiver and the link partner transceiver.

Other aspects and advantages of the present invention will become apparent from the following detailed description,

DETAILED DESCRIPTION

The embodiments include methods and apparatuses for transceiver processing that provide control over the latency of the transceiver processing. The described embodiments provide high throughput transceivers that include signal processing for minimizing multiple interferences and distortions to allow recovery of the remotely transmitted data. The interference and distortion processing may include, for example, adjacent and co-channel interference rejection, transmit signal shaping, data equalization, echo cancelation, near-end cross-talk cancellation, far end cross-talk cancelation, external noise or interference cancellation, and/or non-linear interference cancellation.

Figure 1:
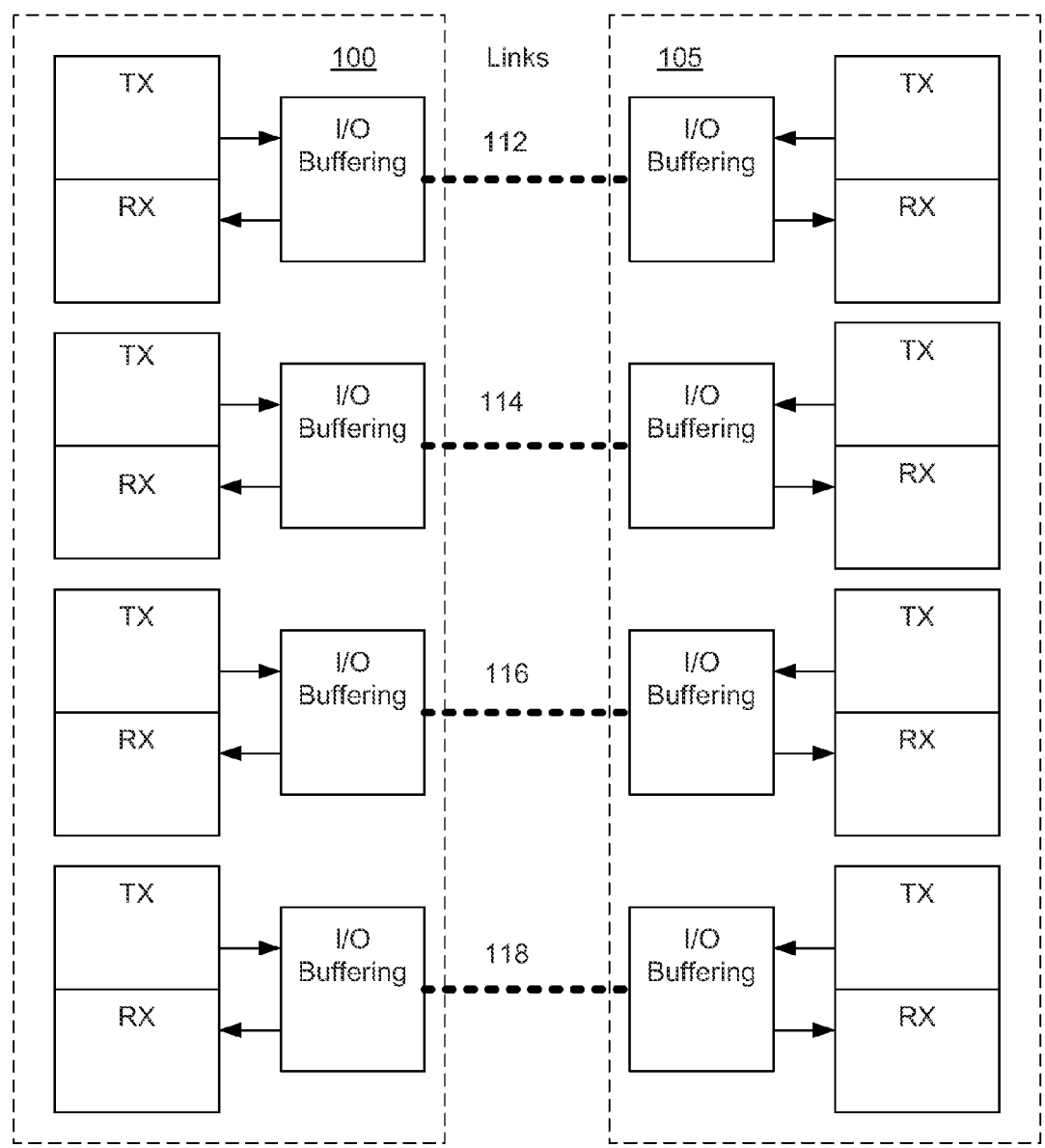
FIG. 1 shows a block diagram of a transceiver pair communicating over a bi-directional transmission channel, according to the prior art.
Figure 2:
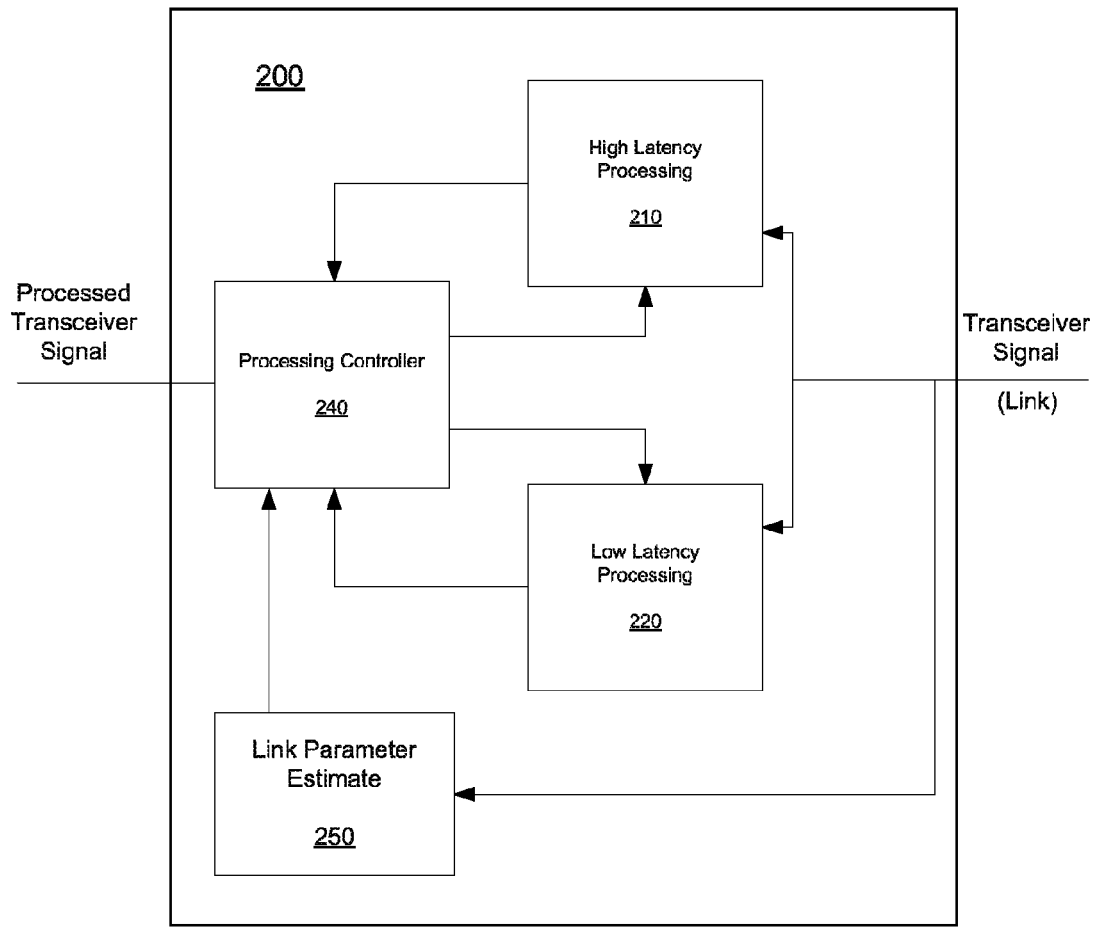
FIG. 2 shows an example of an embodiment of a transceiver that includes high-latency processing and low-latency processing.

FIG. 2 shows an example of an embodiment of a transceiver 200 that includes high-latency processing 210, and low-latency processing 220. The transceiver 200 receives a signal from a link partner transceiver, over a communications link, and the transceiver 200 transmits a signal to the link partner. The transceiver 200 includes a means for determining a link parameter of the communications link (Link Parameter Estimate 250). Based at least in part on the link parameter, a processing controller 240 of the transceiver 200 allocates processing of a transceiver signal between the high-latency processing 210, and low-latency processing 220. The transceiver signal includes any signal that is processed by the transceiver. The transceiver signal typically also includes any signal transmitted or generated by the transceiver, and any signal that is received by the transceiver.

Embodiments of the processing controller include selecting the transceiver processing for a particular signal processing to be either all low-latency processing, all high-latency processing, or a various methods of combining both low-latency processing and high-latency processing.

The link quality parameter can be based on at least one of a length of the link or a transmission time of the link. Alternatively or additionally, the link quality parameter includes an estimated power of components of the receive signal, such as, transmit signal components versus the link partner transmit signal, or versus near-end-crosstalk (NEXT) signal components. Additionally, the link quality parameter includes the waveform details of various processed signals, such as the echo impulse response, NEXT impulse response, FEXT impulse response, or the remote signal's impulse response to the transceiver. Additionally, the link parameter can include other possible metrics such as various distortion levels, decoder performance, and estimated bit or symbol error rates. In addition to the link quality parameter, the allocation between low-latency processing and high-latency processing can be influenced by higher-level applications using the transceiver.

As their labels suggest, high-latency signal processing includes a latency that is generally greater than a latency of the low-latency signal processing. The term latency can be used to represent an amount of time (how long it takes) for a unit of information at an input to processing to arrive at the output of the processing. Generally, the high-latency processing utilizes circuitry that can process the received signal with less hardware resources, usually resulting in processing power, complexity, and area reduction. However, in some situations, it is desirable to reduce the latency of the processing. The low-latency processing provides reduced latency processing, but generally increases power dissipation. Low-latency processing results in a reduction of the delay in processing the information transmitted or/and received using the transceiver, as compared with high-latency processing.

Embodiments include selecting (based at least in part on the link quality parameter) how much of the transceiver signal processing is processed by the high-latency processing and the low-latency processing in order to provide the desired latency performance while attempting to minimize the power dissipation of the overall transceiver signal processing while still meeting the desired error rate performance.

Figure 3:
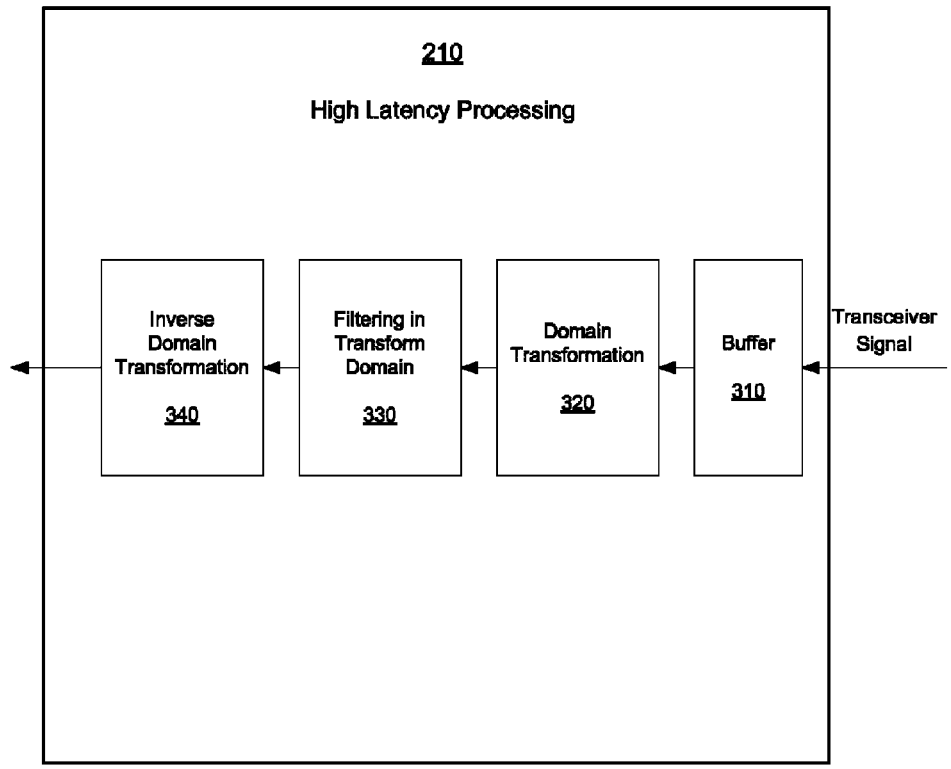
FIG. 3 shows an example of a block diagram of high-latency processing.

FIG. 3 shows an example of a block diagram of an embodiment of high-latency processing (High Latency Processing 210). At a high level, this example of high-latency processing includes a buffer 310, a domain transformation block 320, filtering in the transform domain 330, and an inverse domain transform block 340.

The processed signals can be transformed (domain transformer 320) into a domain where filtering is more efficient, such as the Discrete Fourier Transform (DFT) domain. The filtered transformed signal can be inverse transformed (inverse transformer 340) back to the original domain. The nominal complexity of a real valued DFT is of order $N*\log2(N)$, where N is the block size of the DFT. The exact complexity depends on the input being real or complex valued and implementation details of the DFT, such as FFT size, radix size, memory versus area/speed/latency tradeoffs. Filtering in the DFT transform domain dictates a point by point multiplication of the N samples of DFT processed data with the N DFT samples of the filter. When the application permits processing of N samples at a time, to the first order, filtering N real samples requires $N*\log2(N)+2N+N*\log2(N)$ operations. Computing a filter of length P using a DFT of size N, generates N−P filtered sampled per transformation. The complexity per sample is in the order of $(2*\log2(N)+2)/(1-P/N)$. Whenever the length of the FIR, P, is significantly larger than $2*\log2(N)$ there can be significant simplifications in complexity, and therefore, hardware costs and power dissipation. For example, if N=256>2*P for the case of P=100, the transformed domain requires about (2*log2(256)+2)/(1−100/256) =30 multiply/adds, and the standard implementations requires 100 multiplies and adds per output sample. Neglecting other HW implementation details such as memory, precision, clock rate, etc, this results in a net gain of approximately 3 times.

Figure 4:
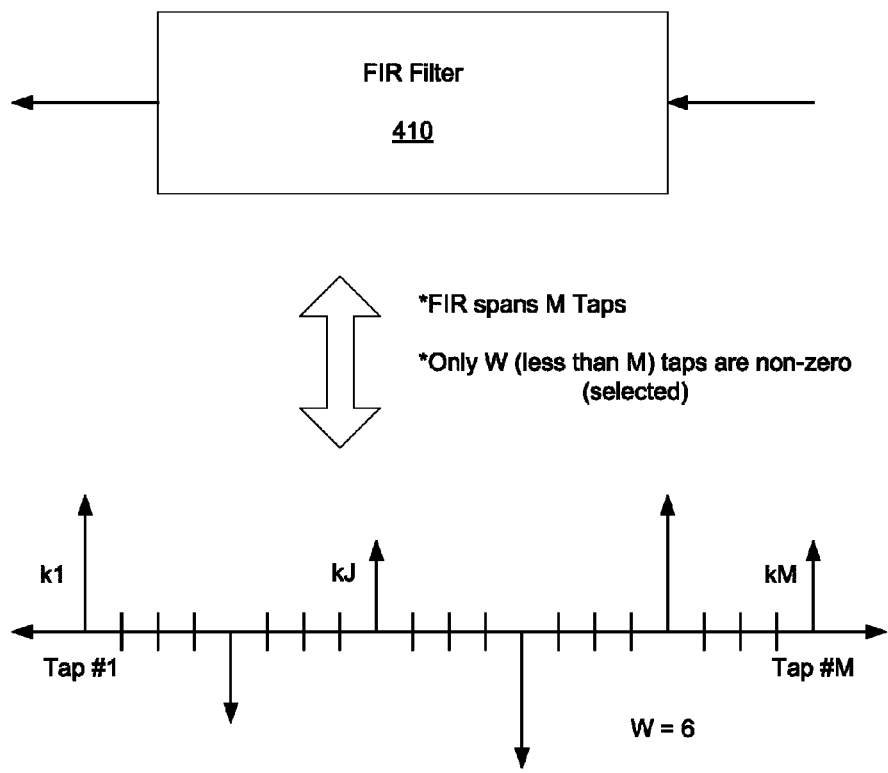
FIG. 4 shows an example of an FIR filter that can be utilized within the low-latency processing.

FIG. 4 shows an example of an FIR filter 410 that can be utilized within the low-latency processing, wherein the time domain filtering includes a fewer number of taps than a time span of the filter. Here, the time span of the filter means all possible non-zero locations of the filter taps. The exemplary filter 410 includes M possible filter tap locations, denoted by k1, k2, and so on, but only W of the M tap locations are non-zero (selected) wherein W is less than M. For the embodiment shown in FIG. 4, W=6. As will be shown and described, embodiments include the selection of non-zero taps, and/or the selection of coefficients of the taps being dependent upon the high-latency processing.

This FIR filter implementation supports many possible required filtering configurations with low complexity. In general, the hardware complexity of an FIR filtering operation strongly depends on the number of non-zero coefficients. By having a small number of non-zero coefficients, low hardware implementation complexity is maintained. This also allows for a low-latency processing because of the time domain filter implementation, which does not require buffering a block of filter input samples. By making the locations of the non-zero filter taps configurable, the filter can accommodate a large variety of filter responses.

The described filter implementation can be used, for example, in echo cancellation processing of a transceiver. The echo cancellation processing generates replicas of the local transmit signal components that are present with the signal transmitted by the link partner, which can be summed with the receive signal to cancel the local transmit signal components. The transmit components are desirably removed as they do not contain any information for the local receiver. The echo cancellation filter generates the required cancellation signals. The echo cancellation filter depends on the signature of the echo response, which has some dependence on the transmitter response, transformer response, board response, and cable echo response. The tap values and locations are different for each different configuration of the communication channel, and therefore, for a low complexity and low-latency implementation, the structure in FIG. 4 can be used.

Figure 5:
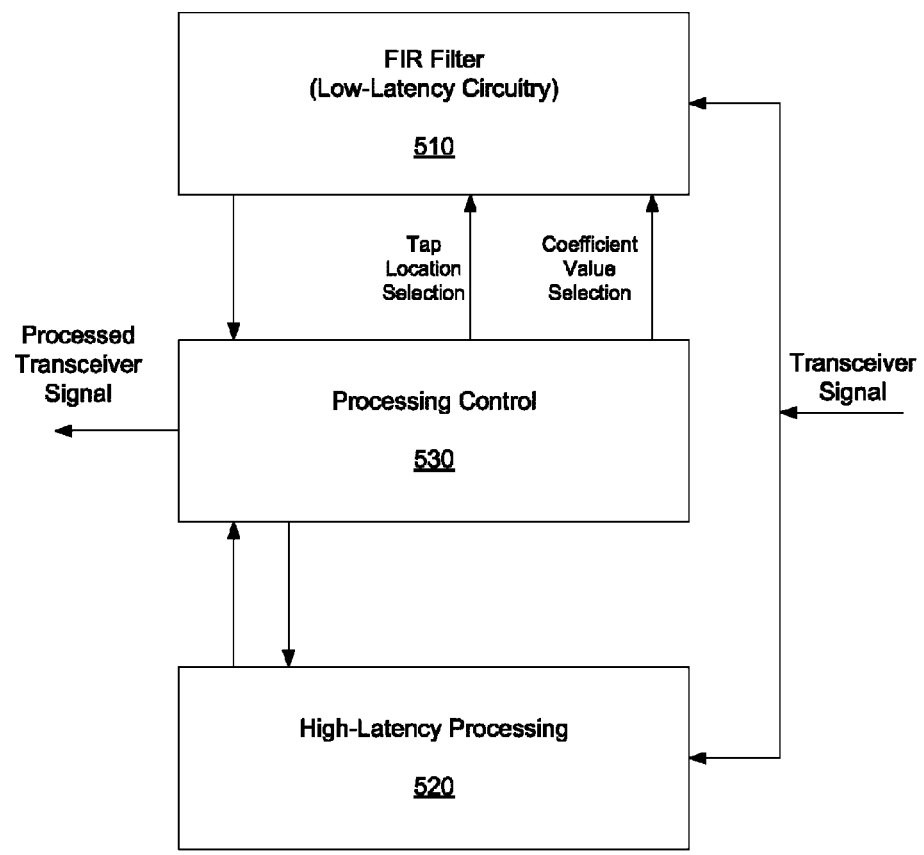
FIG. 5 shows another example of an embodiment of a transceiver that includes high-latency processing and low-latency processing.

FIG. 5 shows another example of an embodiment of a transceiver that includes high-latency processing and low-latency processing. As shown, an FIR filter (low-latency processing) and high-latency processing process a transceiver signal. Processing control 530 selects how much of the processing of the receive/transmit signal is performed by the low-latency processing 510 and the high-latency processing 520. Additionally, tap selection and coefficient selection of the FIR filter of the low-latency processing can be selected at least in part based on the filtering of the high-latency processing.

The high-latency path and low-latency path utilize filters that are configured to have similar filtering functions. As such, in some situations the high-latency path implements a similar filtering operation as the low-latency path, albeit with more latency. As the resulting filtering functions have similarities, the low-latency path can use information from the high-latency path to configure its own filtering operation. For example, if the high-latency path implements the filtering operation using a DFT (Discrete Fourier Transform) domain transformation approach, then the low-latency time domain filter can use the DFT domain filter response to help configure its filtering.

For example, the DFT domain response can be converted to a time domain representation of the high-latency filtering operation. The time domain response can then be used to help determine where (tap locations) the time domain filter has filter taps with significant energy. Those tap locations can then be used in a sparse (few non-zero taps) FIR low-latency implementation (as in FIG. 4) to implement the low-latency filter.

Figure 6:
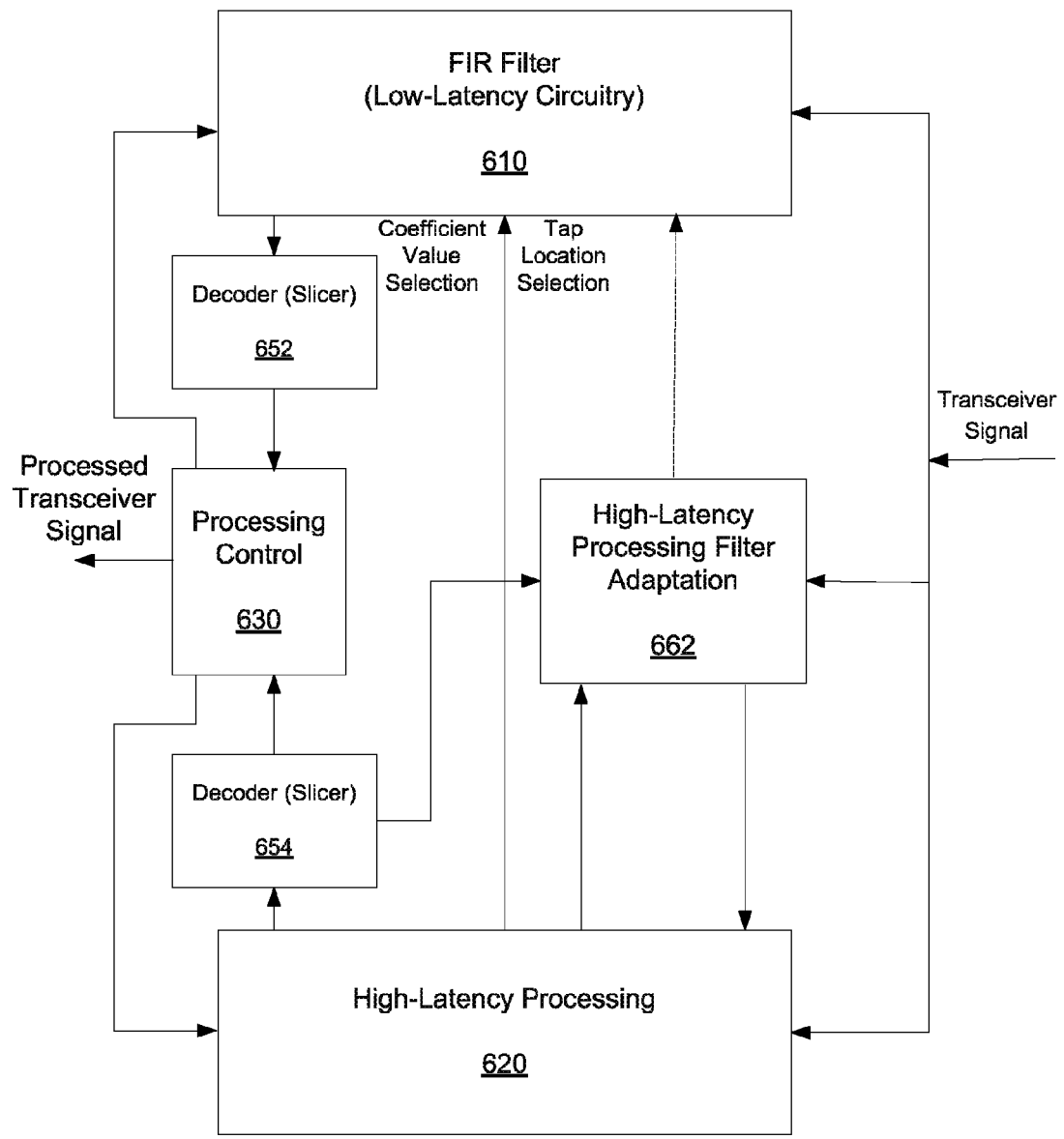
FIG. 6 shows another example of an embodiment of a transceiver that includes high-latency processing and low-latency processing.

FIG. 6 shows another example of an embodiment of a transceiver that includes both high-latency processing and low-latency processing. The embodiment further includes decoders 652, 654 decoding, respectively, the signal processed through the low-latency path 610 and the signal processed through the high-latency path 620. In this embodiment, in addition to the processing controller (processing control 630), the low-latency path also uses the high-latency filter adaptation 662 to help it configure the low-latency processing. It is to be understood that additional processing can be included before each of the decoders 652, 654.

Many filtering operations in Ethernet transceivers require filters that need to adapt or change their configuration throughout the transceiver operation. Such filter adaptation is needed to accommodate the channel conditions at the link establishment time, or start-up. Also, the filters need to adapt to changes in the communication channel and any changes in the waveform signatures of various distortions and interferences. As both the high-latency and the low-latency paths need to be adapted, it is advantageous to use the high-latency adaptation processing, to assist in the adaptation and configuration of the low-latency path processing. Though the high-latency and low-latency paths perform similar filtering operations, the implementation differences can result in different coefficient values in the respective filtering operations.

One possible embodiment based on the example embodiment of FIG. 6 includes using the high-latency adaptation path together with a few additional filter adaptation constraints to adaptively configure the low-latency path processing. Such adaptation can use, for example, least mean squared (LMS) adaptive filtering. For example, to reduce the implementation complexity of the low-latency path, a low-latency time domain filter implementation can include an embodiment similar to the embodiment shown in FIG. 4 that includes few non-zero taps. The high-latency path has more effective taps than the low-latency path because it implements the filtering in the transform domain. However, if the high-latency path adaptation is constrained to have the same non-zero tap locations as the low-latency path, then the high-latency adaptation will adapt to correctly determine the low-latency path coefficient values.

Another embodiment includes adaptively changing the filter tap locations of the low-latency path. Since the low-latency time domain filter taps are sparse (few non-zero taps), it can be difficult to know throughout the transceiver operation if the non-zero filtering tap locations need to change because the low-latency filter tracks only a few tap locations. However, the high-latency domain transformation filtering implementation effectively implements many more taps and by tracking the equivalent time domain taps of the high-latency processing path, required changes in the location (and value) of the low-latency path can be identified.

This embodiment includes the low-latency processing path slicer 652 decoding the received data while the high-latency processing path slicer 654 can also be used to adapt the high-latency processing path filtering and, possibly, the low-latency path filtering.

Figure 7A:
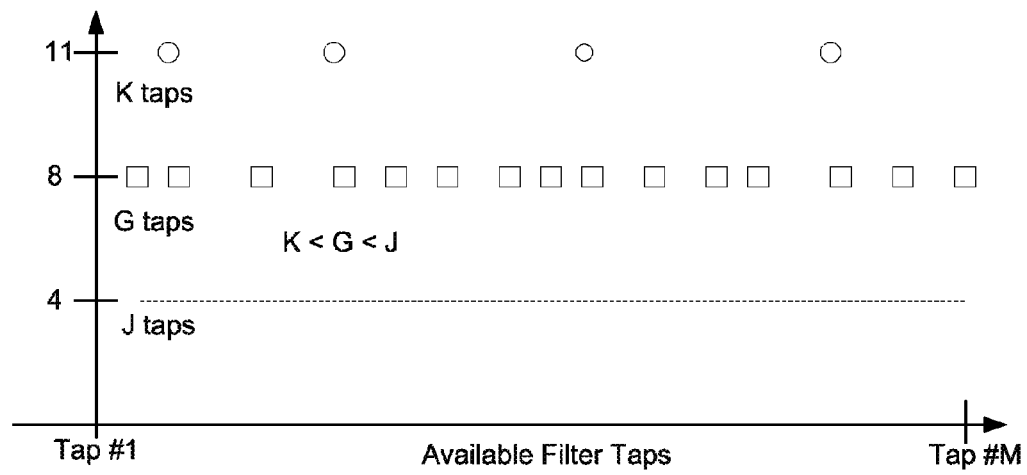
FIG. 7A shows possible filter tap selections of FIR filters in a pyramid tittering architecture.
Figure 7B:
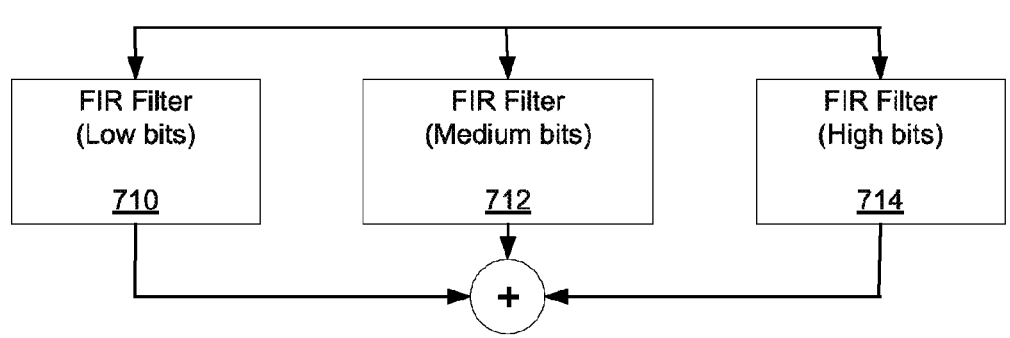
FIGS. 7B, 7C show examples of an embodiment of an FIR filter at includes multiple sub-filters forming a pyramid filtering architecture.
Figure 7C:
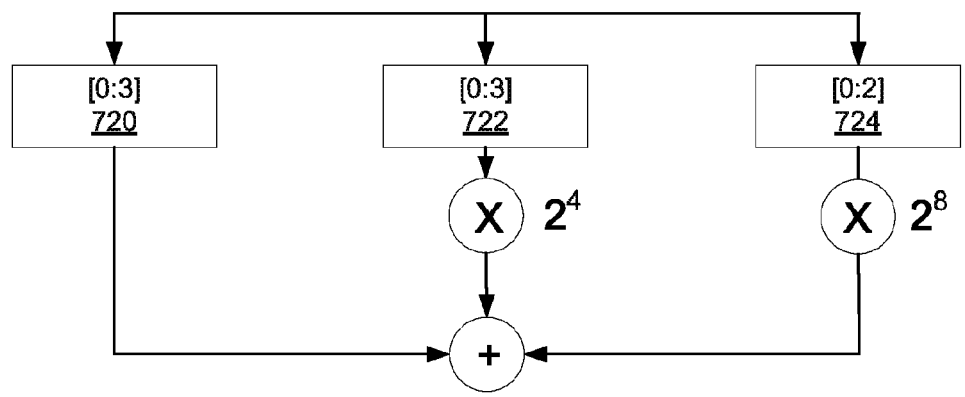

The embodiments of FIGS. 7A, 7B, 7C include a "pyramid filter" implementation that is based on using multiple sub-filters to jointly synthesize a single FIR filter. In the pyramid filter architecture, each sub-filter's coefficients have a small number of binary digits (bits). Each sub-filter's coefficients represent different possible coefficient value ranges out of a maximum coefficient level that needs to be represented.

FIG. 7A shows a hardware efficient FIR filter pyramid architecture that is suitable for a low-latency processing path. This architecture effectively provides the benefits of block-processing performance with a time domain filter implementation. Digital fitters are often implemented with dedicated hardware resources for the filter coefficients. The filtering coefficients are implemented in a finite precision arithmetic with a finite number of digits because the coefficient precision (number of digits) has a large affect on the hardware implementation complexity, area, and power. In a binary coefficient representation, the filter coefficients' precision for a given maximal coefficient size depends on the number of digits, or bits, that are used to represent the filter coefficients. The more accurate the coefficients need to be (for a given coefficient level or magnitude), the more bits are needed in its hardware implementation.

In many filtering applications, the filter coefficients that need to be synthesized are not all the same size. Usually, there are a small number of very large coefficients, a larger number of slightly smaller coefficients, etc. The pyramid filter architecture takes advantage of this coefficient size distribution by being able to synthesize a small number of very large coefficients, a larger number of slightly smaller coefficients (than the "very large coefficients"), etc. The pyramid architecture implements such filter tap distribution efficiently by using parallel filters with different number of taps and coefficient ranges. To have the flexibility of placing the larger coefficients over the entire filter span, each sub-filter in the pyramid filter architecture has flexible non-zero coefficient locations.

The embodiments of FIGS. 7A, 7B, and 7C show examples of an FIR fitter that includes multiple sub-filters forming a pyramid filtering architecture. FIGS. 7A and 7B show the fitter representation in terms of the number of coefficients for each sub-filter. FIG. 7C is another illustration of the concept, where the filter coefficients of all sub-filters span the same value range but the sub-filter outputs are shifted to synthesize different coefficient ranges for the sub-filters.

FIG. 7A shows an example of a pyramid architecture that includes three sub-filters representing different coefficient bits (or digits) in an 11 bit coefficient representation. The first sub-filter has J possible coefficients out of M possible coefficient locations. All J coefficients have 4 bits. To be able to synthesize larger coefficients that require more than 4 bits, a second filter with G taps can be used together with the 1st sub-filter to implement a filter with G large (8 bit) coefficient taps and (J–G) small (4 bit) coefficients taps. To implement 8 bit coefficients, the locations of the J higher range coefficient bits need to be aligned with J locations of the coefficients of the list sub-filter. Proceeding with this idea, a third sub-filter with 3 additional bits representing larger coefficient bits, can be used in conjunction with the two other sub-filters to synthesize coefficients with 11 bits. With all 3 filters configured correctly, there could be K very large (11 bit) taps, (K–G) large (8 bit) taps, and (J–G) small (4 bit) taps.

The block diagram of FIG. 7B shows an equivalent way to represent the pyramid filter architecture, including low bits filter 710 representing the lower bits (digits) in the filter taps, a medium bits filter 712, and high bits filter 714. The outputs of the filters 710, 712, 714 are summed together to form the pyramid filter output.

The block diagram of FIG. 7C shows another equivalent pyramid filter architecture representation, with different sub-filters having different coefficient bit locations. The multiplication of each filter output serves to effectively shift the filtering bits to their desired bit locations in the 11 bit coefficient representation. The low bit filter 720 with 4 bit coefficient represented by [0:3] is summed together with a medium bits filter 722, implemented as a low bits filter together with output scaling of the filter output. The outputs of the low bits and medium bits filter is summed with the high bits filter 724, where the high bits filter is implemented as a low bits filter with an appropriate scaling of the filter output.

One embodiment of the pyramid architecture includes sharing the coefficient sign information among the multiple sub-filters. When all the sub-filters jointly synthesize a coefficient at a specific location, the sign of the resulting coefficient is common to all sub-filter taps forming the resulting coefficient. Therefore, the coefficients of each sub-filter do not need to store the coefficient sign information. Not requiring the sub-filter taps to have the sign information can used to implement the pyramid architecture with reduced hardware complexity.

Significant reductions in the amount of circuitry (hardware) utilized can be obtained with only minimal loss in processing performance by only selecting the most important tap locations to have the largest number of bits.

Figure 8:
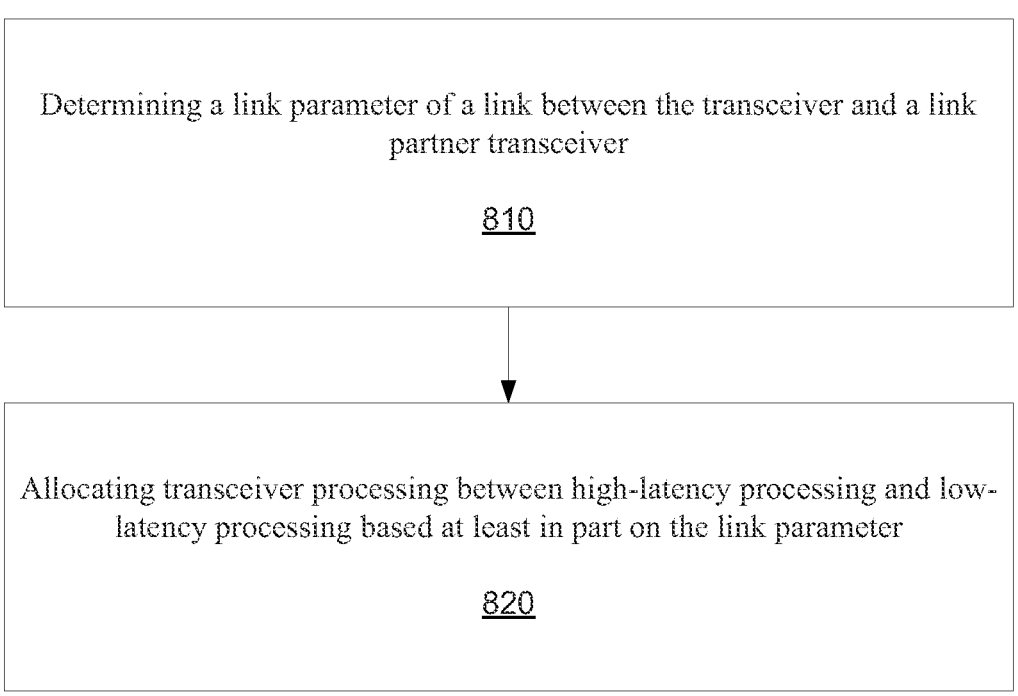
FIG. 8 is a flow chart that includes an example of a method of transceiver processing.

FIG. 8 is a flow chart that includes an example of a method of transceiver processing. A first step 810 includes determining a link parameter of a link between a transceiver and a link partner transceiver. A second step 820 includes allocating transceiver processing between high-latency processing and low-latency processing based at least in part on the link parameter.

It is to be understood that the term allocating includes many possible combinations of low and high-latency processing. For example, the allocation can include all low-latency or all high-latency. The allocation can also include some of the transceiver signals being processed with a high-latency while other transceiver signals are processed with low-latency. The allocation can also include the same signal being processed with both high-latency processing and low-latency processing (as in the example embodiment in FIG. 9).

It is to be understood that link parameter determination can be accomplished in any number of ways. For example, the transceiver can determine the link parameter directly, or the link parameter can be determined elsewhere and communicated to the transceiver. The link quality can be estimated by a receive signal quality, such as, signal to noise ratio of the receive signal.

For an embodiment, the high-latency processing comprises transform domain processing and the low-latency processing comprises time domain processing.

An embodiment further includes transmit processing a transmit signal of the transceiver, wherein the transmit processing comprises allocating between high-latency processing and low-latency processing. That is, for example, the transceiver can cancel echo signals by processing a transmit signal, and summing the processed transmit signal with the receive signal. The processing of the transmit signal can include both high-latency processing and low-latency processing which can be adaptively selected.

For embodiments, the link parameter includes an estimated length of the link between the transceiver and the link partner transceiver and/or an estimated transmission time between the transceiver and the link partner transceiver. For embodiments, the amount of low-latency processing relative to the high-latency processing increases as the estimated length of the link decreases. However, it is to be understood that transmission latency is not always the dominant factor in the overall latency. The transceiver processing usually dominates (block processing, decoding, etc). But as the link gets shorter, generally, the received signal becomes stronger relative to echo signals, and therefore, the echo signal needs to be cancelled to a lesser degree. Additionally, a shorter link generally includes more link margin, and therefore, interference, such as, echo/NEXT/FEXT needs to be cancelled to a lesser degree.

For an embodiment the allocation of the latency processing (between high and low-latency processing) also is additionally dependent at least in part on the higher level application using the transceiver. For example, some applications require low-latency even at the cost of increased power. Other applications are not sensitive to the transceiver latency.

Due to the disparity in power dissipation of the high-latency processing and the low-latency processing, embodiments further include controlling power consumption of the transceiver processing by controlling the high-latency processing and the low-latency processing.

For embodiments, the transceiver processing includes block-processing. Additionally, the block size can be variable. The latency can be further controlled by selectively adjusting the block size.

For embodiments, the transceiver processing includes at least one of equalization, echo cancellation processing, NEXT (near-end-crosstalk) cancellation processing, FEXT (far-end-crosstalk) cancellation processing. For embodiments, the low-latency processing includes time domain filtering, wherein the time domain filtering includes a fewer number of taps than a number of possible filter tap locations. For embodiments, the tap selections of the time domain filters of the low-latency processing are dependent on the high-latency processing. More specifically, for embodiments, coefficient selections of the time domain filter of the low-latency processing are dependent upon the high-latency processing, and/or time domain filter taps are selected based upon high-latency path adaptation information.

Embodiments of the high-latency path uses block processing, which effectively implements a filter which has filter taps at all locations spanned by the filter. The high-latency block processing solution implements a solution which uses all taps in filtering. Knowledge of all these coefficient values can be useful in determining the correct locations/values of the time domain low-latency path, which does not have filter taps at all locations.

For an embodiment, the high-latency processing includes block processing, and further includes utilizing least-mean-square processing for adaptation of the block processing. Additionally, filter settings of the high-latency processing are matched with filter settings of the time domain processing, which can include constraining frequency domain adaptation. More specifically, in order for the low-latency path to use adaptation information from the high-latency path, the filter adaptation of the high and low-latency paths needs to be matched in terms of reference decision delay, filter spans, adaptation error delay, etc.

An embodiment includes adaptively selecting non-zero filter taps of the time domain filtering based on high-latency processing filters. Changes in the selection of the non-zero tap locations can be initiated by temperature changes, cable shaking, or some other change to the channel response, echo response, NEXT response, FEXT response, sampling clock, and others.

For an embodiment, at least one time domain filter includes a plurality of sub-filters, wherein the sub-filters includes filter coefficients that are limited to within a bounded range of values. More specifically, embodiment of the time domain filters are implemented using a pyramid sub-filter architecture in which a single time domain filter is implemented as a combination of multiple sub-filters, wherein coefficients of each sub-filter are limited to fall within a bounded range of values. For example, a filter having 11 bits in its largest tap can be implemented as a combination of a sub-filter having J coefficients of 4 bits, a sub-filter having G coefficients of 4 bits (G<J), and a sub-filter having K coefficients of 3 bits (K<G). Further, sign information of each coefficient can be shared by all sub-filters having a common tap location.

For an embodiment, the transceiver processing includes at least two slicers, a first slicer generating errors and decisions for the high-latency processing and a second slicer generating errors and decisions for the low-latency processing.

For an embodiment, allocating between low-latency and high-latency processing further comprises controlling decoder processing. Decoder processing control can include turning on or off the decoder to provide further latency control. Decoder processing control can further include operating the decoder with different latencies, choosing an appropriate balance between the decoder performance and the latency associated with different decoder performance levels. For examples, for low-latency processing, the decoder can terminate the decoding with less iterations.

Figure 9:
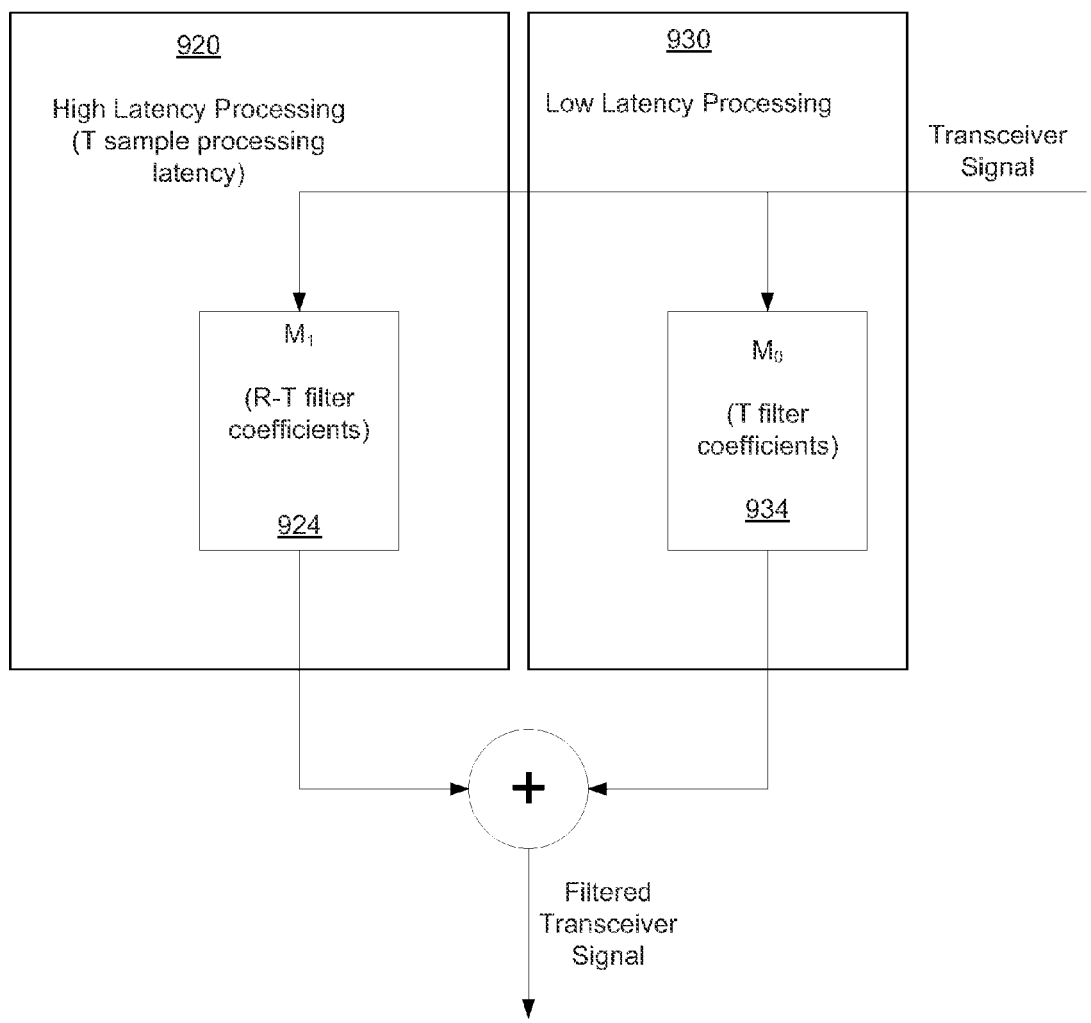
FIG. 9 shows another example of an embodiment of a transceiver that includes high-latency processing and low-latency processing.

FIG. 9 shows another example of an embodiment of a transceiver that includes high-latency processing 920 and low-latency processing 930. The embodiment of FIG. 9 depicts how a long FIR filter with R coefficients can be partitioned into sub-filtering structures 934 and 924, each implementing a different coefficient subset of the filter coefficients. The filter 934, implements the first T filter coefficients M0 that process the T most recent samples of the input signal can be implemented using low-latency processing. The last (R−T) filter coefficients 924 nominally operate on less recent samples, and can therefore be implemented with a hardware efficient, high-latency processing. Since the coefficients nominally multiplying less recent samples M1 have more time to compute their outputs, their higher-latency processing does not add latency to the overall processing latency. As long as the high-latency filter processing 924 has less than a T-sample processing latency relative to the low-latency processing path, the high-latency processing path does not add any latency to the overall R-tap fitter operation. The output of the low-latency filter M0 is summed together with the output of the high-latency filter processing M1 to compute the output of an overall filter that has low-latency processing.

Figure 10:
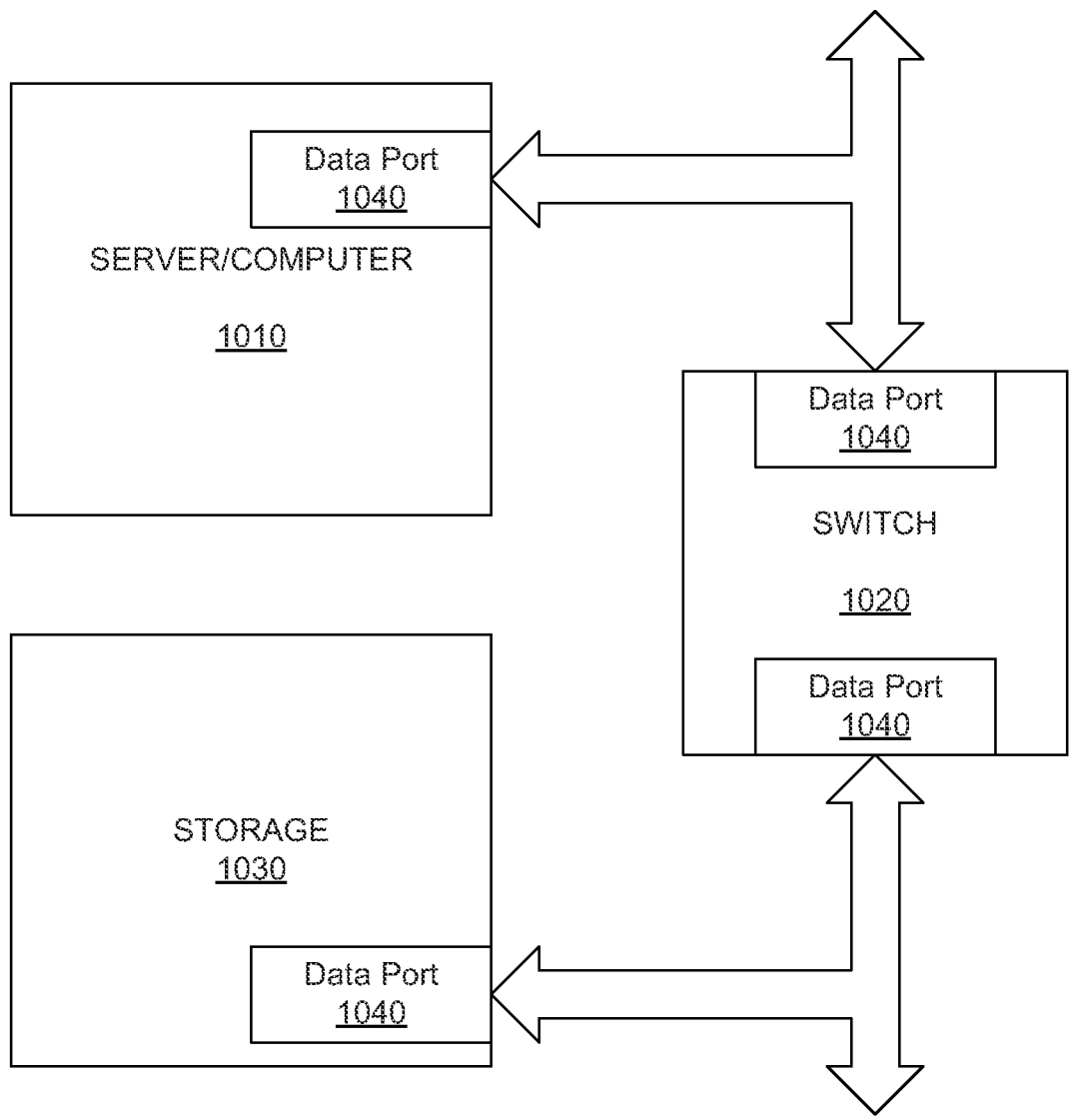
FIG. 10 shows devices connected to an Ethernet network that can include embodiments of transceiver high-latency processing and low-latency processing.

FIG. 10 shows devices connected to an Ethernet network that can include embodiments of transceiver high-latency processing and low-latency processing within transceivers 1040. The network includes a server/computer 1010, a switch 1020 and storage 1030 that can all benefit from high-latency and low-latency control of a transceiver 1040. The server/computer 1010 can be connected to the switch 1020 through an Ethernet twisted pair LAN connection. The switch 1020 can additionally be connected to the storage 1030 through an Ethernet twisted pair LAN connection. The transceivers 1040 within the server/computer 1010, the switch 1020, and the storage 1030 can provide high- and low-latency control of transceiver processing with the transceivers 1040.

Performance Advantages Offered by Domain Transformation Processing

Examples can be provided to demonstrate the advantages of domain transformation joint processing of Ethernet transceiver signals over time domain joint processing of Ethernet transceiver signals to reduce the effects of transmission interference. The examples provided include DFT transformations, however, other domain transformations can be used.

Typical Ethernet LAN connections suffer from self-interference (ISI, echo interference) and/or cross talk interference (NEXT, FEXT) that spans anywhere from 10 samples to 1000 samples depending on the type of interference. Echo interference and NEXT interference typically require longer spans of 100-1000 samples, and FEXT and ISI require shorter spans of 10-100 samples. Other factors that effect the number of required samples include the Ethernet cable length and cable type (cat5, 5e, 6, 6e 7, etc). For simplification, 100 samples are used for the following examples.

Time Domain Processing

To implement a single FIR with P real valued coefficients, a standard processor must perform P real valued multiplies and adds for each desired filtered output sample. This number greatly increases for the Ethernet filtering because the Ethernet transceiver must process multiple transmit signals and multiple receive signals. Additionally, the Ethernet transceiver mitigates coupling of the multiplicity of signals.

Although specific embodiments of the invention have been described and illustrated, the invention is not to be limited to the specific forms or arrangements of parts so described and illustrated. The invention is limited only by the appended claims.

What is claimed:

1. A method of transceiver processing, comprising:
   determining a link parameter of a twisted pair copper link between a transceiver and a link partner transceiver;
   allocating transceiver processing resources between transform domain processing and time domain processing based at least in part on the link parameter, wherein a circuit processing latency associated with the transform domain processing in the transceiver is greater than a circuit processing latency associated with the time domain processing in the transceiver.

2. The method of claim 1, further comprising transmit processing a transmit signal of the transceiver, wherein the transmit processing comprises allocating between transform domain processing and time domain processing.

3. The method of claim 1, further comprising influencing the allocation between transform domain processing and the time domain processing to control power consumption of the transceiver processing.

4. The method of claim 1, wherein the link parameter comprises an estimated length of the link between the transceiver and the link partner transceiver.

5. The method of claim 1, wherein the link parameter comprises an estimated power of components of a transceiver signal.

6. The method of claim 1, wherein the link parameter comprises an estimated transmission time between the transceiver and the link partner transceiver.

7. The method of claim 4, wherein an amount of time domain processing relative to the transform domain processing increases as the estimated length of the link decreases.

8. The method of claim 1, where in the transform domain processing comprises block-processing.

9. The method of claim 1, where the transceiver processing comprises block-processing with variable block sizes to control latency.

10. The method of claim 1, wherein the transceiver processing comprises at least one of equalization, echo cancellation processing, NEXT (near-end-crosstalk) cancellation processing, FEXT (far-end-crosstalk) cancellation processing, and receive signal decoding.

11. The method of claim 1, wherein the time domain processing comprises time domain filtering, wherein the time domain filtering comprises a fewer number of taps than a time span of the filter.

12. The method of claim 11, wherein tap-location selections of the time domain filtering of the low-latency processing are dependent on the transform domain processing.

13. The method of claim 11, wherein coefficient-value selections of the time domain filtering of the time domain processing are dependent upon the transform domain processing.

14. The method of claim 11, further comprising choosing the time domain filter taps based upon high-latency path adaptation information.

15. The method of claim 14, wherein the transform domain processing comprises block processing, and further comprising utilizing least-mean-square processing for adaptation of the block processing.

16. The method of claim 11, further comprising matching filter settings of the transform domain processing with filter settings of the time domain filtering, comprising constrained frequency domain adaptation.

17. The method of claim 1, wherein the transceiver processing comprises at least two slicers, a first slicer generating errors and decisions for the transform domain processing and a second slicer generating errors and decisions for the time domain processing.

18. The method of claim 11, further comprising at least one time domain filter comprising a plurality of sub-filters, wherein the sub-filters comprise filter coefficients that are limited to within a bounded range of values.

19. The method of claim 18, further comprising sign information of each coefficient being shared by all sub-filters having a common tap location.

20. The method of claim 1, wherein allocating between time domain and transform domain processing further comprises controlling decoder processing.

21. A transceiver, comprising:
   transform domain processing circuitry;
   time domain processing circuitry;
   a transceiver processing controller allocating transceiver processing between the transform domain processing circuitry and the time domain processing circuitry based at least in part on a link parameter of a twisted pair copper link between the transceiver and the link partner transceiver, and wherein a circuit processing latency associated with the transform domain processing circuitry in the transceiver is greater than a circuit processing latency associated with the timing domain processing circuitry in the transceiver.

22. The transceiver of claim 21, wherein the transform domain processing circuitry comprises block-processing.

23. The transceiver of claim 21, wherein at least one of the time domain processing circuitry and the transform domain processing circuitry comprises time domain filters, wherein the time domain filters comprise a fewer number of taps than a time span of the filter.

24. The transceiver of claim 21, wherein tap selections of time domain filters of the time domain processing circuitry are dependent upon the transform domain processing circuitry.

25. The transceiver of claim 24, further comprising selecting the time domain filter taps based on transform domain processing information.

26. The transceiver of claim 25, wherein the transform domain processing circuitry comprises block processing, and further comprising utilizing least-mean-square processing for adaptation of the block processing.

27. The transceiver of claim 25, further comprising matching filter settings of the transform domain processing circuitry to filter settings of the time domain processing circuitry, comprising constraining frequency domain adaptation.

28. The transceiver of claim 24, further comprising adaptively selecting non-zero filter taps of time domain filters based on transform domain processing circuitry.

29. The transceiver of claim 28, further comprising at least one time domain filter comprises a plurality of sub-filters, wherein the sub-filters comprise filter coefficients that are limited to within a bounded range of values.

* * * * *